(12) United States Patent
Fukano et al.

(10) Patent No.: US 9,410,639 B2
(45) Date of Patent: Aug. 9, 2016

(54) SPOOL VALVE

(71) Applicant: SMC CORPORATION, Chiyoda-ku (JP)

(72) Inventors: Yoshihiro Fukano, Moriya (JP); Takayuki Murai, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 117 days.

(21) Appl. No.: 14/212,002

(22) Filed: Mar. 14, 2014

(65) Prior Publication Data

US 2014/0299799 A1   Oct. 9, 2014

(30) Foreign Application Priority Data

Apr. 8, 2013   (JP) .................................. 2013-080458

(51) Int. Cl.
| | |
|---|---|
| *F16K 31/12* | (2006.01) |
| *F16K 31/122* | (2006.01) |
| *F16K 31/124* | (2006.01) |
| *F16K 3/24* | (2006.01) |

(52) U.S. Cl.
CPC . *F16K 31/12* (2013.01); *F16K 3/24* (2013.01); *F16K 31/124* (2013.01); *F16K 31/1221* (2013.01); *F16K 31/1223* (2013.01)

(58) Field of Classification Search
CPC . F16K 31/12; F16K 31/1221; F16K 31/1223; F16K 31/124; F16K 3/24
USPC ........................... 137/624.11, 635.69, 625.64
See application file for complete search history.

(56) References Cited

U.S. PATENT DOCUMENTS

| | | | | |
|---|---|---|---|---|
| 3,580,281 A | * | 5/1971 | Petersen | ............. F15B 13/0436 137/596.16 |
| 3,633,624 A | * | 1/1972 | Leibfritz | ............. F16B 13/0402 137/625.64 |
| 3,653,409 A | * | 4/1972 | Brannon | ............. F15B 13/0402 137/625.6 |
| 3,918,488 A | * | 11/1975 | Minami | .................. B60T 13/18 137/596.16 |
| 2006/0086395 A1 | | 4/2006 | Matsumoto et al. | |

FOREIGN PATENT DOCUMENTS

| | | |
|---|---|---|
| CN | 1766384 A | 5/2006 |
| JP | 7-103360 A | 4/1995 |
| JP | 8-285123 | 11/1996 |

OTHER PUBLICATIONS

Office Action issued Mar. 11, 2014, in Japanese Patent Application No. 2013-080458 with English translation of pertinent portions.
Combined Office Action and Search Report issued Dec. 1, 2015 in Chinese Patent Application No. 201410139032.X (with English language translation).

* cited by examiner (Continued)

*Primary Examiner* — Kevin Lee
(74) *Attorney, Agent, or Firm* — Oblon, McClelland, Maier & Neustadt, L.L.P.

(57) ABSTRACT

A spool valve is equipped with a valve body, a spool arranged in a valve chamber such that the spool can be displaced between a first position, which allows communication between an inlet port and an outlet port, and a second position, which blocks communication between the inlet port and the outlet port, a pilot valve mechanism disposed in the valve body and which causes displacement of the spool along an axial direction under the pressure of a pilot fluid that acts on one end surface of the spool, and a spring that biases the spool toward one side in the axial direction.

14 Claims, 13 Drawing Sheets

SPOOL VALVE

CROSS-REFERENCE TO RELATED APPLICATION

This application is based upon and claims the benefit of priority from Japanese Patent Application No. 2013-080458 filed on Apr. 8, 2013, the contents of which are incorporated herein by reference.

BACKGROUND OF THE INVENTION

1. Field of the Invention

The present invention relates to a spool valve in which a spool is disposed in a valve chamber of a valve body having an inlet port and an outlet port formed therein.

2. Description of the Related Art

Heretofore, for example, in an air-jet loom in which wefts are made to fly out by jets of compressed air, a two-way valve has widely been used. With this type of air-jet loom, it is desirable for a high speed valve with a large flow rate to be used. However, in the case that a two-way valve is used, because a large force is required instantaneously, a disadvantage results in that the solenoid coil that makes up the two-way valve is large in size with a commensurate increase in power consumption. Further, with such a two-way valve, the discharge flow rate and pressure cannot be controlled.

A spool valve is known in which the discharge flow rate and pressure can be controlled. In such a spool valve, a spool is arranged in a valve chamber of a valve body having a plurality of ports formed therein, and a structure is provided in which the respective ports are opened and closed by displacement of the spool in an axial direction. In relation to this type of spool valve, a technical concept is known in which, by controlling a current supplied to a proportional solenoid disposed in the valve body, the spool is displaced directly and the pressure on the secondary side of the spool is steadily controlled (see, e.g., Japanese Laid-Open Patent Publication No. 08-285123).

SUMMARY OF THE INVENTION

A spool valve such as the one disclosed in Japanese Laid-Open Patent Publication No. 08-285123 is applied in a solenoid type in which an electromagnetic force is used for moving the spool. For this reason, in the case that a pressure fluid having a large flow rate is led out from the spool valve, a disadvantage results in that the solenoid coil must be made large in size together with a commensurate increase in power consumption.

The present invention has been made in consideration of the aforementioned problems, and has the object of providing a spool valve, which is capable of controlling a discharge flow rate and pressure, and of minimizing the size of the spool valve and reducing power consumption, even in the event that a pressure fluid having a large flow rate is led out from the spool valve.

To achieve the foregoing object, a spool valve according to the present invention comprises a valve body formed with a valve chamber, and an inlet port and an outlet port that open on a wall surface of the valve chamber and through which a pressure fluid flows, a spool arranged in the valve chamber such that the spool can be displaced between a first position, which allows communication between the inlet port and the outlet port, and a second position, which blocks communication between the inlet port and the outlet port, a pilot valve mechanism disposed in the valve body and which causes displacement of the spool along an axial direction under the pressure of a pilot fluid that acts on one end surface of the spool, and a spring that biases the spool toward one side in the axial direction.

According to the spool valve of the present invention, because the spool is displaced in an axial direction using a pressure of the pilot fluid, the lead out flow rate and pressure can be controlled, and even in the event that a pressure fluid having a large flow rate is led out from the spool valve, the spool valve can be made smaller in size and power consumption can be reduced in comparison with a conventional solenoid type of spool valve. Further, since the pressure of the pilot fluid can be made to act directly on the one end surface of the spool, high speed responsiveness and compactness of the spool valve can be achieved, without requiring a piston or the like that receives a pressure of the pilot fluid to be connected to the spool.

In the above-described spool valve, the pilot valve mechanism may include a pilot fluid introduction passage that guides the pilot fluid to the one end surface of the spool, a pilot fluid discharge passage through which the pilot fluid is discharged, and a proportional valve disposed in the pilot fluid introduction passage, and the spool is displaced corresponding to a degree of opening of the proportional valve.

In accordance with the above structure, since the spool can be displaced responsive to the degree of opening of the proportional valve, with a simplified structure, the pressure (flow rate) of the pressure fluid that is led out from the outlet port can be subjected to a proportional control.

The above-described spool valve may further comprise a first pressure acquiring means for acquiring a pressure of the pilot fluid that acts on the one end surface of the spool, a second pressure acquiring means for acquiring a pressure of the pressure fluid led out from the outlet port, and a proportional valve control unit that controls the degree of opening of the proportional valve based on the pressure acquired by the first pressure acquiring means and the pressure acquired by the second pressure acquiring means.

In accordance with the above-described structure, the pressure (flow rate) of the pressure fluid that is led out from the outlet port can be controlled to a desired pressure (flow rate).

The above-described pilot valve mechanism may include a pilot fluid introduction passage that guides the pilot fluid to the one end surface of the spool, a pilot fluid discharge passage through which the pilot fluid is discharged, an introduction valve that switches the pilot fluid introduction passage between an open condition and a closed condition, a discharge valve that switches the pilot fluid discharge passage between an open condition and a closed condition, an introduction valve control unit that controls the introduction valve, and a discharge valve control unit that controls the discharge valve.

In accordance with the above-described structure, by controlling opening and closing of the introduction valve and the discharge valve, with a simple structure, the pressure of the pilot fluid can be made to act on the one end surface of the spool.

The above-described spool valve may further comprise an opening time setting unit that sets a time of opening of the introduction valve, wherein the introduction valve control unit opens and closes the introduction valve based on the time of opening set by the opening time setting unit.

In accordance with the above-described structure, since the spool can be displaced corresponding to the time of opening for the introduction valve that is set in the opening time setting unit, with a simple structure, the pressure (flow rate) of the pressure fluid that is led out from the outlet port can freely be controlled.

The above-described spool valve may further comprise a waiting time setting unit that sets a waiting time from switching of the introduction valve from the open condition to the closed condition until the discharge valve is opened, wherein the discharge valve control unit maintains the discharge valve in the closed condition until elapse of the waiting time set by the waiting time setting unit from switching of the introduction valve from the open condition to the closed condition.

In accordance with the above-described structure, since the waiting time period until opening of the discharge valve from closure of the introduction valve can be set in the waiting time setting unit, with a simple structure, the time during which the pressure fluid is led out from the outlet port can freely be controlled.

In the above-described spool valve, the introduction valve control unit may open and close the introduction valve multiple times in succession. In this case, with a simple structure, the pressure (flow rate) of the pressure fluid led out from the outlet port can be raised in a stepwise fashion.

In the above-described spool valve, the discharge valve control unit may open and close the discharge valve multiple times in succession. In this case, with a simple structure, the pressure (flow rate) of the pressure fluid led out from the outlet port can be lowered in a stepwise fashion.

In the above-described spool valve, the discharge valve control unit may open the discharge valve with the introduction valve being in the open condition. In accordance with this structure, compared to the case of opening the discharge valve with the introduction valve being in a closed condition, the pressure (flow rate) of the pressure fluid led out from the outlet port can be decreased gradually.

In the above-described spool valve, the pilot valve mechanism may further include a proportional valve disposed in the pilot fluid introduction passage, the introduction valve control unit may open and close the introduction valve under a condition in which the proportional valve is open, and the discharge valve control unit may open and close the discharge valve under a condition in which the proportional valve is open.

In accordance with the above-described structure, the pressure (flow rate) of the pressure fluid that is led out from the outlet port can be controlled efficiently to a desired pressure (flow rate).

In the above-described spool valve, a discharge port that opens on a wall surface of the valve chamber may be formed in the valve body, and in a condition in which the spool is positioned at the second position, communication is established between the outlet port and the discharge port, and in a condition in which the spool is positioned at the first position, communication is blocked between the outlet port and the discharge port.

In accordance with such a structure, since the outlet port and the discharge port are placed in communication in a state in which communication between the inlet port and the outlet port is blocked, the pressure fluid from the outlet port can be discharged to the exterior from the discharge port. Consequently, compared to a situation in which the discharge port is not provided, the pressure (flow rate) of the pressure fluid can be decreased rapidly.

According to the present invention, because the spool is displaced in an axial direction using a pressure of the pilot fluid, the lead out flow rate and pressure can be controlled, and even in the event that a pressure fluid having a large flow rate is led out from the spool valve, the spool valve can be made smaller in size and power consumption can be reduced in comparison with a conventional solenoid type of spool valve. Further, since the pressure of the pilot fluid can be made to act directly on the one end surface of the spool, high speed responsiveness and compactness of the spool valve can be achieved, without requiring a piston or the like that receives a pressure of the pilot fluid to be connected to the spool.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Below, a preferred embodiment of a spool valve according to the present invention and a control method in relation thereto will be described with reference to the accompanying drawings.

Figure 1:
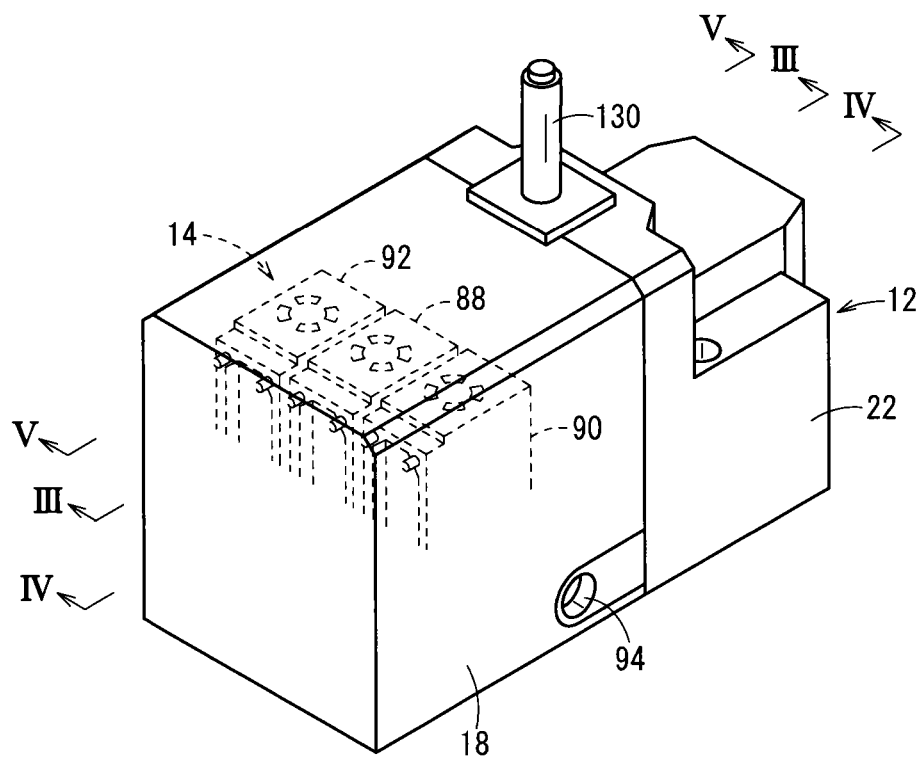
FIG. 1 is a perspective view of a spool valve according to an embodiment of the present invention.
Figure 2:
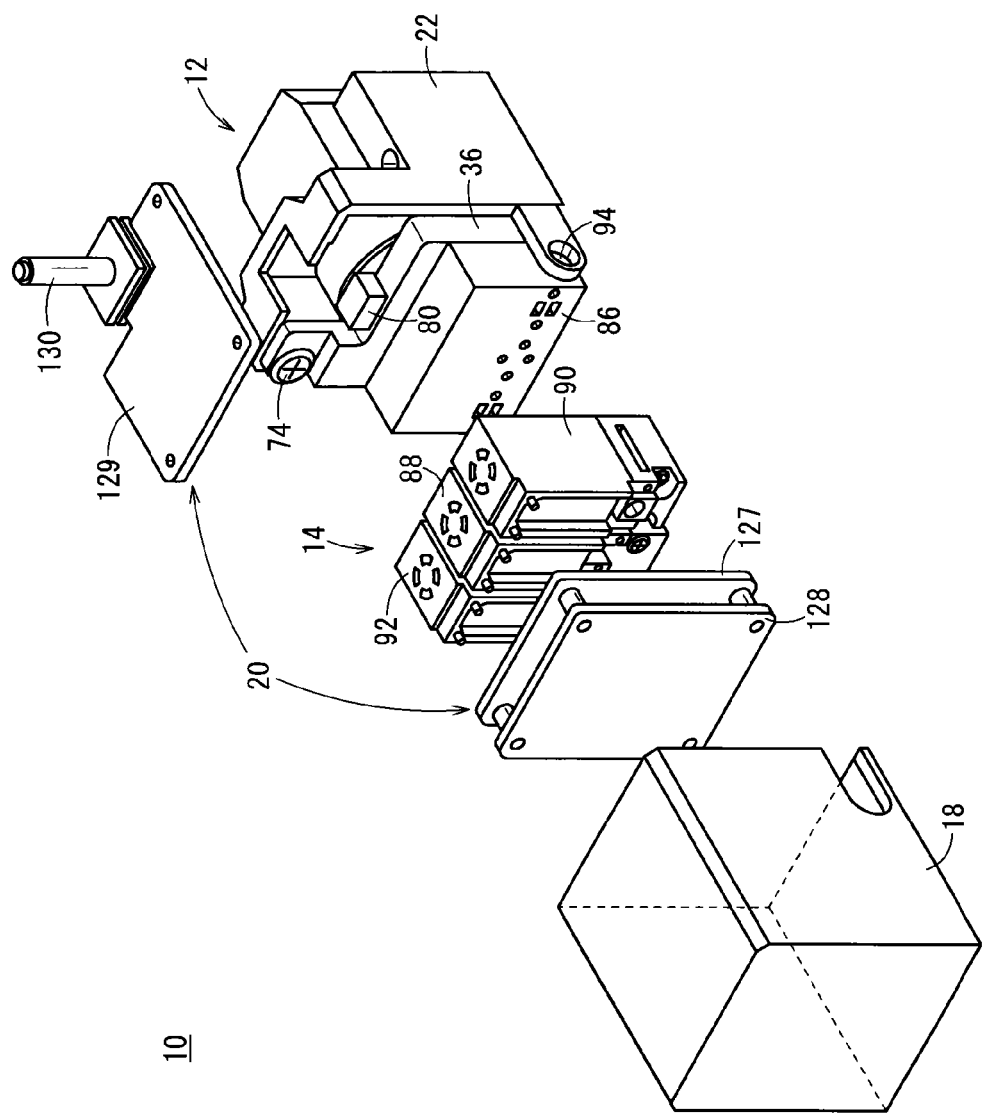
FIG. 2 is an exploded perspective view of the spool valve.

As shown in FIGS. 1 and 2, a spool valve 10 according to the present embodiment is equipped with a spool valve main body 12, a pilot valve mechanism 14 disposed in the spool valve main body 12, a cover member 18 that surrounds the pilot valve mechanism 14, and a controller 20.

Figure 3:
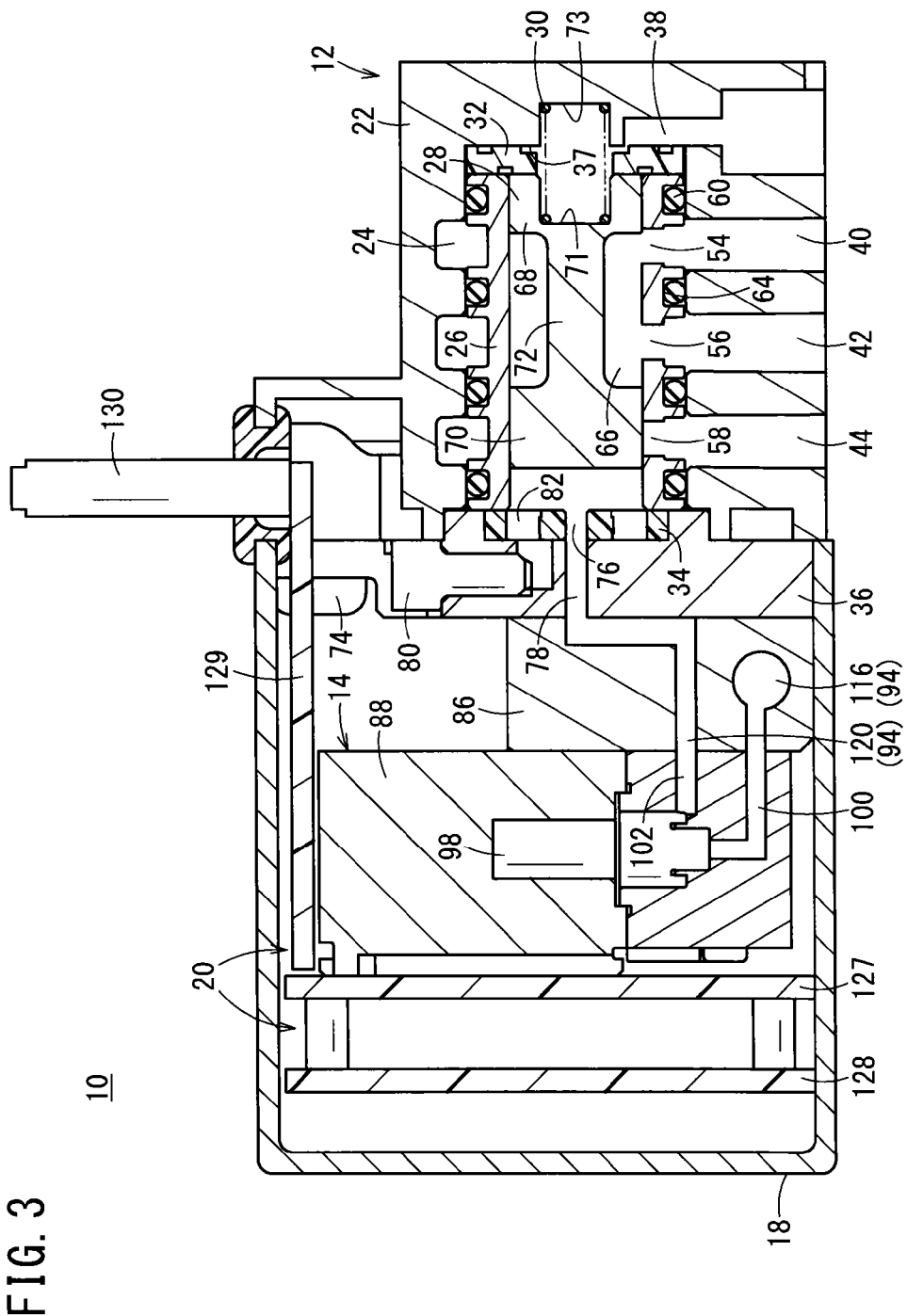
FIG. 3 is a cross sectional view taken along line III-III of FIG. 1.
Figure 4:
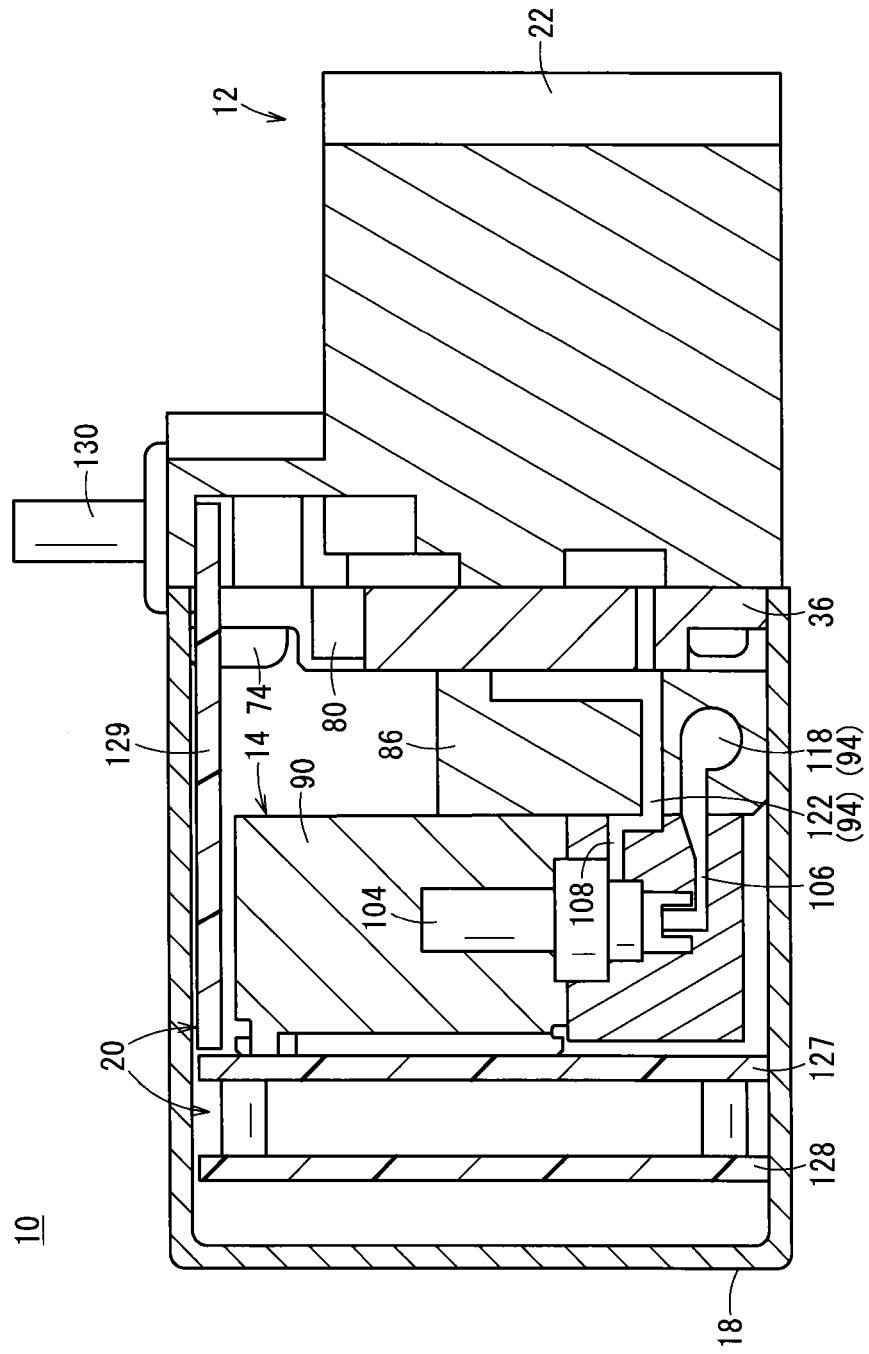
FIG. 4 is a cross sectional view taken along line IV-IV of FIG. 1.

As shown in FIG. 3, the spool valve main body 12 includes a block-shaped valve body 22, a cylindrical sleeve 26 arranged in a valve chamber 24 that opens on one end surface of the valve body 22, a spool (main valve) 28 arranged in the interior of the sleeve 26 such that the spool 28 can be displaced (slidably moved) along the axial direction of the sleeve 26, a spring 30 that biases the spool 28 toward one end side, a pair of annular end plates 32, 34 provided on both sides in the axial direction of the sleeve 26, and a retaining plate 36 disposed on the one end surface of the valve body 22.

The valve body 22 has a breathing port 38 which opens on an abutment surface 37 of the wall surfaces making up the valve chamber 24, the abutment surface 37 being directed toward one end of the spool 28, wherein the end plate 32 abuts against the abutment surface 37. The breathing port 38 takes in and exhausts air on the other end side of the spool 28.

Further, in the valve body 22, an inlet port 40, an outlet port 42, and a discharge port (exhaust port) 44, which open on a wall surface making up the valve chamber 24, are formed successively in this order at equal intervals along the axial direction of the spool 28. More specifically, the outlet port 42 is positioned between the inlet port 40 and the discharge port 44.

Figure 6:
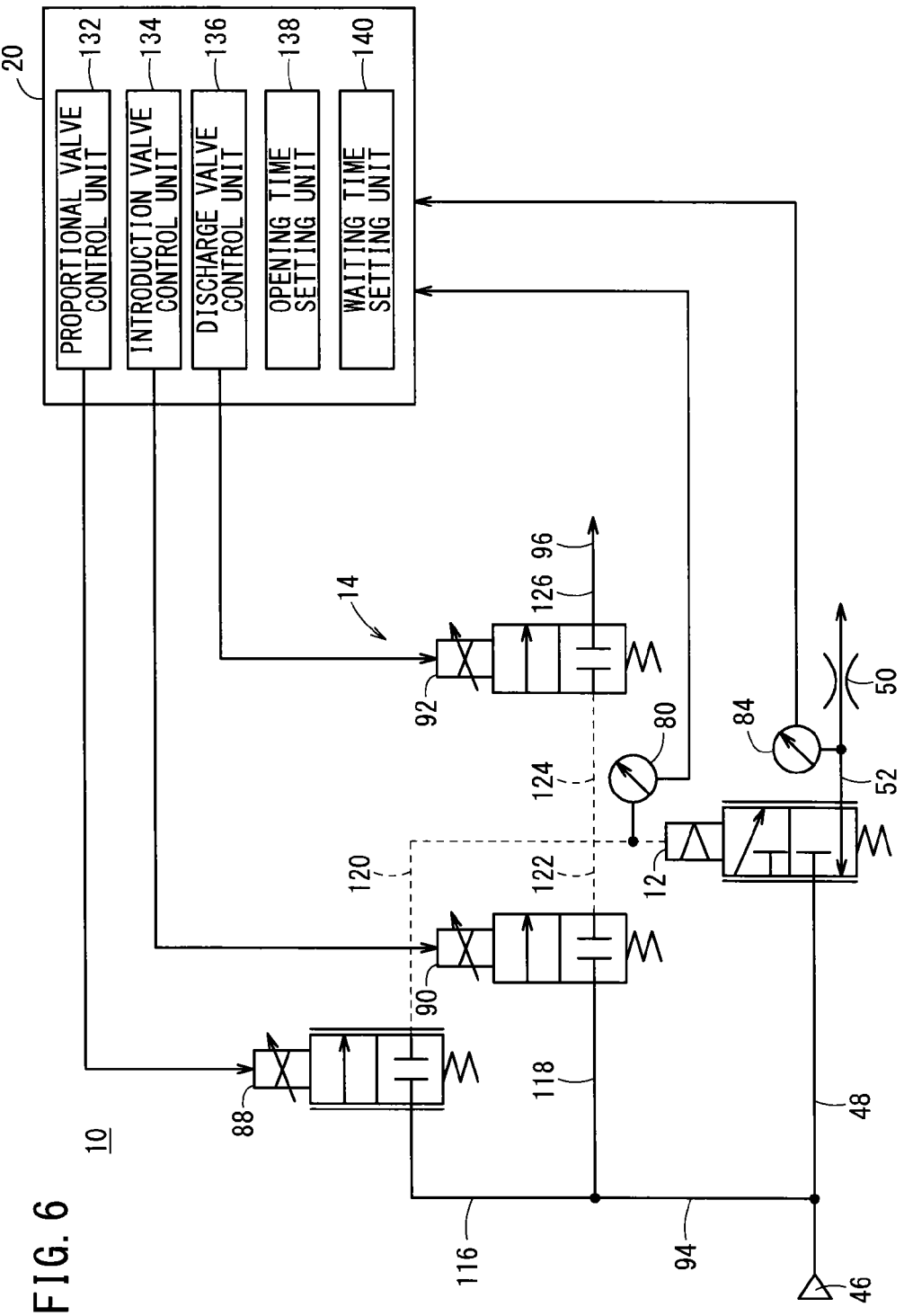
FIG. 6 is a view of a circuit diagram for the spool valve.

As can be understood from FIG. 6, the inlet port 40 communicates with a pressure fluid introduction passage 48 connected to a pressure fluid supply source 46, and the outlet port 42 communicates with a pressure fluid lead out passage 52 connected to a nozzle 50. More specifically, the spool valve 10 according to the present embodiment can be used in an air-jet loom in which the pressure fluid is ejected out from the nozzle 50 so as to enable wefts to be ejected.

A first hole 54 that communicates with the inlet port 40, a second hole 56 that communicates with the outlet port 42, and a third hole 58 that communicates with the discharge port 44 are formed respectively in the sleeve 26. Movement of the sleeve 26 in the axial direction is restricted as a result of the sleeve 26 being sandwiched between the pair of end plates 32, 34. A plurality of ring grooves 64 (four in the illustrated example) are formed on the outer circumferential surface of the sleeve 26 with sealing members 60 being disposed therein. The ring grooves 64 are positioned on both sides of the first through third holes 54, 56, 58, respectively.

The spool 28 is formed with a length that is shorter than the total length of the sleeve 26, and has a shape in which an annular recess 66 is formed roughly in the center along the axial direction of a cylindrical member. More specifically, the spool 28 is of a shape such that two large diameter portions 68, 70 are connected through a narrow middle portion 72. The outer circumferential surfaces of the respective large diameter portions 68, 70 are arranged in sliding contact with the inner surface of the sleeve 26.

Figure 7:
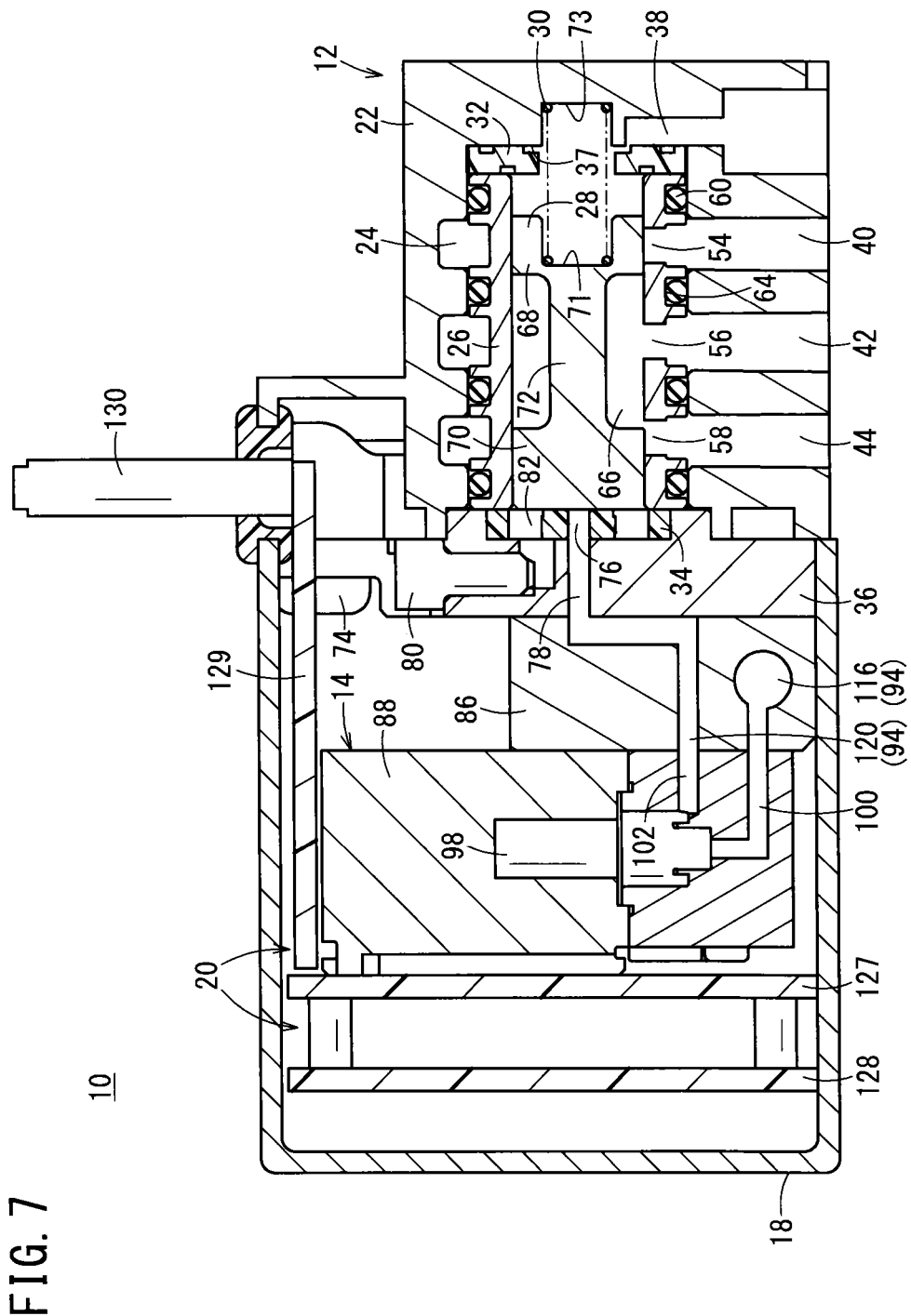
FIG. 7 is an explanatory drawing showing a state in which the spool that constitutes the spool valve shown in FIG. 3 is displaced to a first position.

With the present embodiment, in a condition in which the other end surface of the spool 28 is positioned at the other end of the sleeve 26 (i.e., when the spool 28 is located at a first position), the inlet port 40 and the outlet port 42 communicate with each other through the annular recess 66, whereas communication between the outlet port 42 and the discharge port 44 is blocked. Further, in a condition in which the one end surface of the spool 28 is positioned at the one end of the sleeve 26 (i.e., when the spool 28 is located at a second position), communication between the inlet port 40 and the outlet port 42 is blocked, whereas the outlet port 42 and the discharge port 44 communicate with each other through the annular recess 66 (see FIG. 7).

A helical compression spring or coil spring, for example, can be used as the spring 30. One end of the spring 30 is arranged in a recess 71 formed in the other end surface of the spool 28, and the other end of the spring 30 is arranged in a recess 73 formed in the abutment surface 37 of the valve chamber 24. Consequently, the spool 28 is biased or urged toward the one end side by the spring 30.

Figure 5:
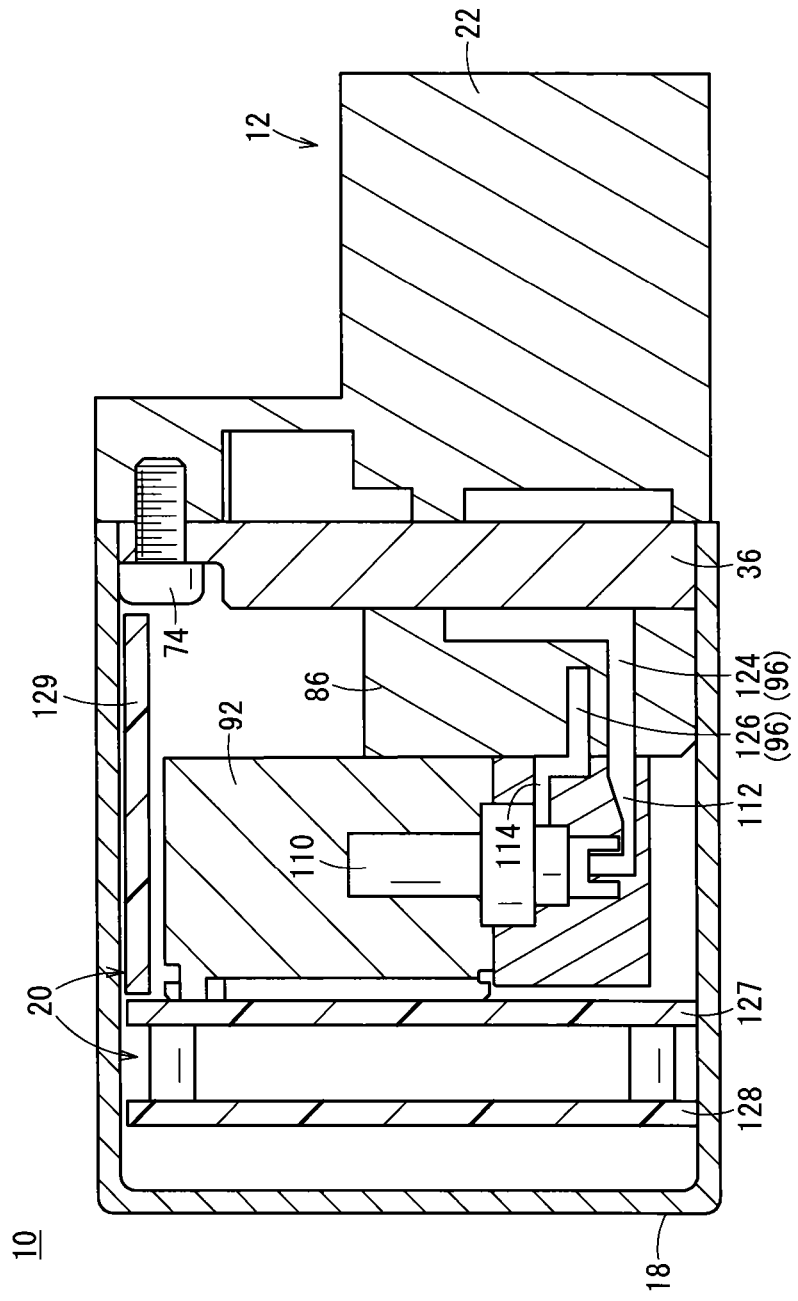
FIG. 5 is a cross sectional view taken along line V-V of FIG. 1.

In a condition with the end plate 34 mounted thereon, the retaining plate 36 is fixed to the valve body 22 by a bolt 74 (see FIGS. 2 and 5). A communication passage 78, which communicates with the interior of the sleeve 26 (valve chamber 24) through a central hole 76 in the end plate 34, is formed in the retaining plate 36.

A first pressure sensor (first pressure acquiring means) 80 for acquiring the pressure of a pilot fluid that acts on the one end surface of the spool 28 is disposed in the retaining plate 36. The first pressure sensor 80 is capable of contacting the pilot fluid, which is guided from the interior of the sleeve 26 (valve chamber 24) through a penetrating hole 82 formed in the end plate 34. Further, in the present embodiment, a second pressure sensor (second pressure acquiring means) 84 for acquiring a pressure on the secondary side of the spool 28 is disposed in the pressure fluid lead out passage 52 (see FIG. 6).

As shown in FIGS. 2 through 6, the pilot valve mechanism 14 is a mechanism that causes the pressure of the pilot fluid to act on the one end surface of the spool 28. The pilot valve mechanism 14 includes an adapter plate 86, a proportional valve, 88, an introduction valve 90, and a discharge valve 92.

The adapter plate 86 is fixed to one end surface of the retaining plate 36. A pilot fluid introduction passage 94 for introducing the pilot fluid to one end surface of the spool 28, and a pilot fluid discharge passage 96 for discharging the pilot fluid are formed in the adapter plate 86 (see FIG. 6). The pilot fluid introduction passage 94 is connected to the pressure fluid introduction passage 48. Details concerning the structure of the pilot fluid introduction passage 94 and the pilot fluid discharge passage 96 will be described later.

The proportional valve 88 serves to open and close the pilot fluid introduction passage 94, and includes a proportional valve main body 98, a first port 100 to which the pilot fluid is introduced, and a second port 102 through which the pilot fluid is led out (see FIG. 3).

As can be understood from FIG. 6, the introduction valve 90 is disposed in parallel with the proportional valve 88 and functions as a two-way valve that opens and closes the pilot fluid introduction passage 94. The introduction valve 90 includes an introduction valve main body 104, a first port 106 to which the pilot fluid is introduced, and a second port 108 through which the pilot fluid is led out (see FIG. 4).

The discharge valve 92 is constituted as a two-way valve that opens and closes the pilot fluid discharge passage 96. The discharge valve 92 includes a discharge valve main body 110, a first port 112 to which the pilot fluid is introduced, and a second port 114 through which the pilot fluid is led out (see FIG. 5).

The pilot fluid introduction passage 94 includes a first introduction passage 116 that guides the pressure fluid from the pressure fluid introduction passage 48 to the first port 100 of the proportional valve 88, a second introduction passage 118 that guides the pressure fluid to the first port 106 of the introduction valve 90, a third introduction passage 120 that guides the pilot fluid, which has been led out from the second port 102 of the proportional valve 88, to the one end surface of the spool 28, and a fourth introduction passage 122 that guides the pilot fluid, which has been led out from the second port 108 of the introduction valve 90, to the one end surface of the spool 28. The first introduction passage 116 and the second introduction passage 118 communicate with each other, and the third introduction passage 120 and the fourth introduction passage 122 communicate with each other.

The pilot fluid discharge passage 96 contains a first discharge passage 124 that guides the pilot fluid, which has been directed to the one end surface of the spool 28, to the first port 112 of the discharge valve 92, and a second discharge passage that discharges, to the exterior, the pilot fluid that has been led out from the second port 114 of the discharge valve 92. The first discharge passage 124 communicates with the third introduction passage 120 and the fourth introduction passage 122.

The controller 20 includes a plurality of wiring boards 127, 128, 129 (three in the illustrated example), which are connected electrically to the first pressure sensor 80, the proportional valve 88, the introduction valve 90, and the discharge valve 92, and a connection terminal 130 disposed on the wiring board 129 and connected to a non-illustrated external device.

As shown in FIG. 6, the controller 20, which is controlled by signals from an external device, includes a proportional valve control unit 132, an introduction valve control unit 134, a discharge valve control unit 136, an opening time setting unit 138, and a waiting time setting unit 140. More specifically, transmission and reception of signals (analog signals or digital signals) between the controller 20 and the external device may be carried out by way of wireless communications or wired communications. Further, the controller 20 receives signals (pressure waveform signals) output from the external device, for example, and based on such signals, controls opening and closing of the proportional valve 88, the introduction valve 90, and the discharge valve 92. At this time, the controller 20 receives signals output from at least one of the first pressure sensor 80 and the second pressure sensor 84, and is capable of effecting feedback controls on the proportional valve 88, the introduction valve 90, and the discharge valve 92.

Although in the present embodiment, the proportional valve control unit 132, the introduction valve control unit 134, the discharge valve control unit 136, the opening time setting unit 138, and the waiting time setting unit 140 are disposed on the plural wiring boards 127, 128, 129, the control units may be provided on the aforementioned external device. In the case that the proportional valve control unit 132, the introduction valve control unit 134, the discharge valve control unit 136, the opening time setting unit 138, and the waiting time setting unit 140 are disposed on the external device, since the wiring boards 127, 128, 129 can be simplified in structure (for example, some of the wiring boards 127, 128, 129 can be eliminated), the spool valve 10 can be further reduced in size.

The proportional valve control unit 132 controls the degree of opening of the proportional valve 88 based on output signals output from at least one of the first pressure sensor 80 and the second pressure sensor 84. The introduction valve control unit 134 controls opening and closing of the introduction valve 90, and the discharge valve control unit 136 controls opening and closing of the discharge valve 92. The opening time setting unit 138 sets a time of opening of the introduction valve 90, and the waiting time setting unit 140 sets a waiting time from switching of the introduction valve 90 from the open condition to the closed condition until the discharge valve 92 is opened.

The spool valve 10 according to the present embodiment is constructed basically as described above. Next, a method of controlling the spool valve 10 will be described.

In an initial condition of the present embodiment, each of the proportional valve 88, the introduction valve 90, and the discharge valve 92 is closed. More specifically, because the pilot fluid is not supplied to the spool valve main body 12, the spool 28 is pressed by the spring 30 and is placed in the second position (see FIG. 7). Stated otherwise, since communication between the inlet port 40 and the outlet port 42 is blocked, ejection of pressure fluid from the nozzle 50 is stopped.

With the control method according to the present embodiment, at first, the opening time setting unit 138 sets the opening time of the introduction valve 90 to time t1, and the waiting time setting unit 140 sets the waiting time to time t2. The times t1 and t2, for example, are determined based on a necessary pressure or flow rate, etc., required for the pressure fluid to be ejected from the nozzle 50, and are stored beforehand in the controller 20.

Figure 8:
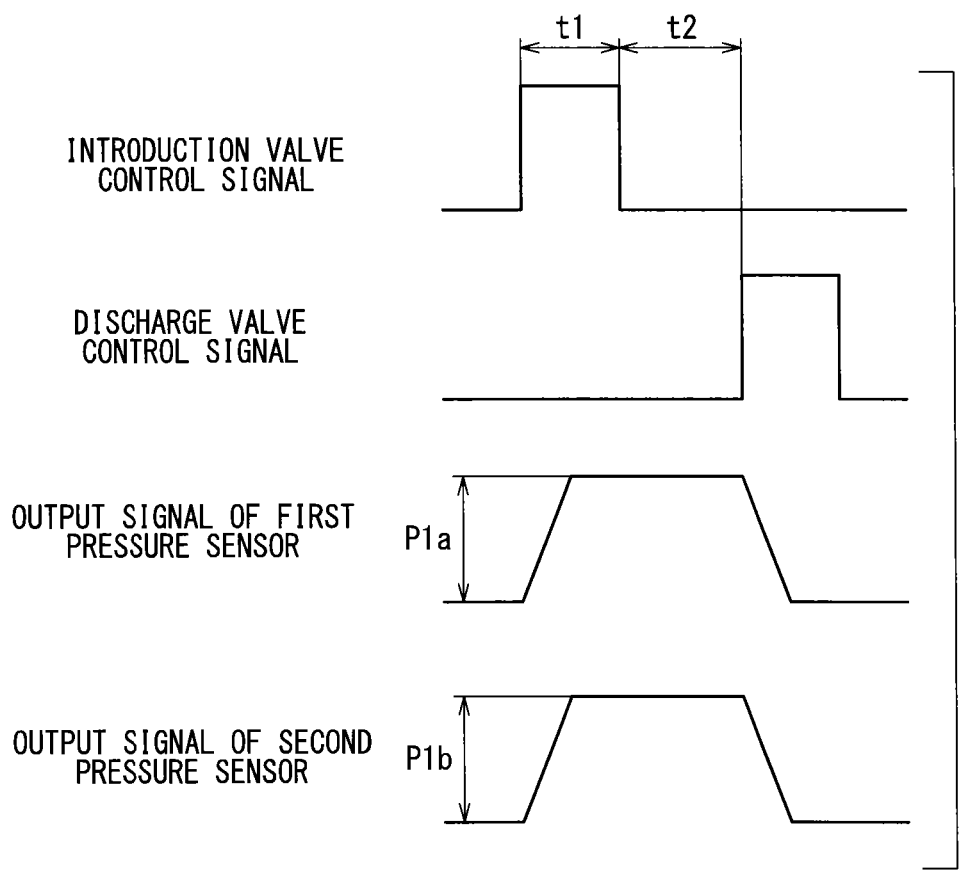
FIG. 8 is an explanatory diagram of a control method for the spool valve.

Next, as shown in FIG. 8, the introduction valve control unit 134 opens the introduction valve 90 for the time t1 that was set by the opening time setting unit 138. When the introduction valve 90 is opened, the pilot fluid, which is led out from the second port 108 of the introduction valve 90, is guided to the one end surface of the spool 28 through the fourth introduction passage 122, the communication passage 78 of the retaining plate 36, and the hole 76 of the end plate 34. More specifically, the pressure of the pilot fluid acts on the one end surface of the spool 28, whereupon the spool 28 is displaced to the other end side while compressing the spring 30. In the present embodiment, the spool 28 is displaced from the second position to the first position. At this time, the pressure of the pilot fluid that acts on the one end surface of the spool (hereinafter referred to as a "first pressure") reaches a pressure P1a.

Further, since the inlet port 40 and the outlet port 42 are placed in communication when the spool 28 is displaced to the first position, the pressure fluid from the inlet port 40 flows into the outlet port 42 via the annular recess 66 of the spool 28. In addition, the pressure fluid that was guided to the outlet port 42 passes through the pressure fluid lead out passage 52 and is ejected from the nozzle 50. At this time, the pressure of the pressure fluid that flows through the pressure fluid lead out passage 52 (hereinafter referred to as a "second pressure") reaches a pressure P1b.

Additionally, upon closure of the introduction valve 90, the first pressure is maintained at the pressure P1a, together with the second pressure being maintained at the pressure P1b. More specifically, the pressure fluid is ejected at a constant pressure from the nozzle 50.

Next, the discharge valve control unit 136 maintains the closed state of the discharge valve 92 until elapse of the time t2 after closing of the introduction valve 90. During such a closed state, the pressure fluid continues to be ejected from the nozzle 50. At this time, the second pressure is maintained at the pressure P1b.

Further, after time t2 elapses from closing of the introduction valve 90, the discharge valve control unit 136 opens and closes the discharge valve 92. When the discharge valve 92 is opened, the pilot fluid is discharged to the exterior through the first discharge passage 124, the first port 112 of the discharge valve 92, the second port 114 of the discharge valve 92, and the second discharge passage 126. When this is done, since the first pressure is lowered, the spool 28 is pressed by the spring 30 and is restored to the second position.

When the spool is restored to the second position, communication between the inlet port 40 and the outlet port 42 is interrupted, whereas the outlet port 42 and the discharge port 44 are placed in communication. Consequently, the pressure fluid from the pressure fluid lead out passage 52 is discharged to the exterior through the outlet port 42, the annular recess 66 of the spool 28, and the discharge port 44. Thus, ejection of the pressure fluid from the nozzle 50 is stopped.

As described above, according to the present embodiment, because the spool 28 is displaced in an axial direction using a pressure of the pilot fluid, the flow rate (lead out flow rate) and pressure of the pressure fluid flowing out from the outlet port 42 can be controlled, while in addition, the spool valve 10 can be made smaller in size and power consumption can be reduced in comparison with a conventional solenoid type of spool valve. Further, since the pressure of the pilot fluid can be made to act directly on the one end surface of the spool 28, high speed responsiveness and compactness of the spool valve 10 can be achieved, without requiring a piston or the like that receives a pressure of the pilot fluid to be connected to the spool 28.

Further, since the outlet port 42 and the discharge port 44 are placed in communication in a state in which communication is blocked between the inlet port 40 and the outlet port 42, the pressure fluid from the outlet port 42 can be discharged to the exterior from the discharge port 44. Consequently, compared to a situation in which the discharge port 44 is not provided, the pressure (flow rate) of the pressure fluid can be decreased rapidly.

Furthermore, according to the present embodiment, by controlling opening and closing of the introduction valve 90 and the discharge valve 92, with a simple structure, the pressure of the pilot fluid can be made to act on the one end surface of the spool 28.

In the present embodiment, in the event that control is performed in the foregoing manner, the proportional valve 88 and the proportional valve control unit 132 may be dispensed with. In this case, the structure of the spool valve 10 can be further reduced in size. The same holds true for the first modification and the third modification, which will be described below.

(Modification 1)

Next, a control method for a spool valve 10 according to a first modification of the present embodiment will be described with reference to FIG. 9.

Figure 9:
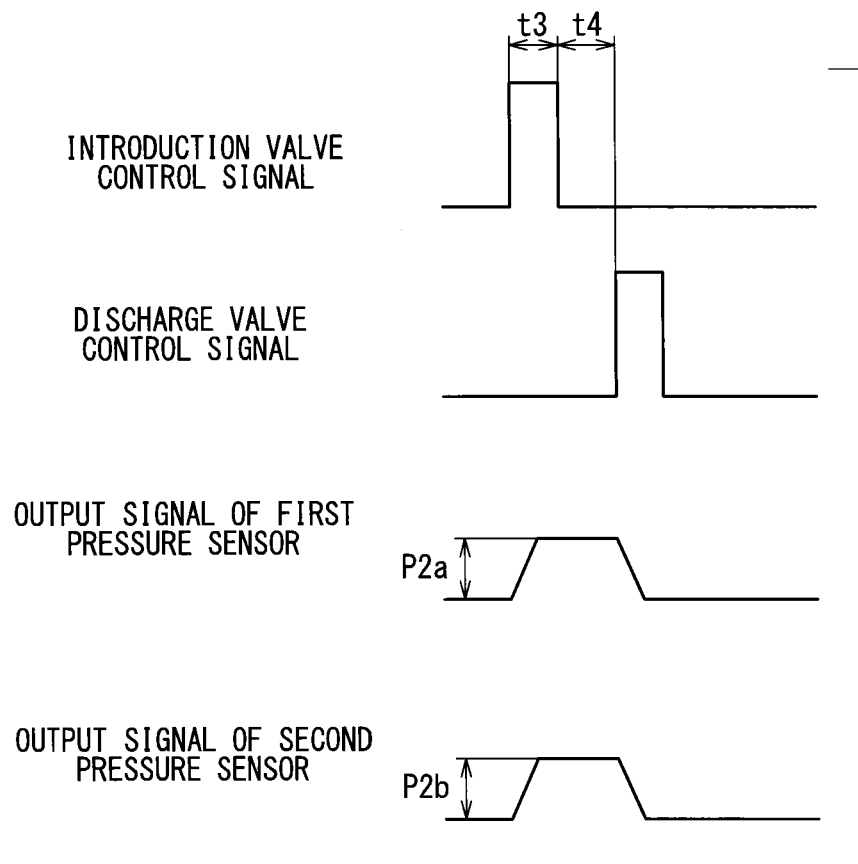
FIG. 9 is an explanatory diagram of a control method for a spool valve according to a first modification.

With the present modification, as shown in FIG. 9, at first, the opening time setting unit 138 sets the opening time of the introduction valve 90 to time t3, and the waiting time setting unit 140 sets the waiting time to time t4. In this case, the time t3 is half of the time t1, and the time t4 is half of the time t2. The times t3 and t4, for example, are set based on the required pressure or flow rate, etc., needed for the pressure fluid to be ejected from the nozzle 50, and are stored beforehand in the controller 20.

Next, the introduction valve control unit 134 opens the introduction valve 90 for the time t3 that was set by the opening time setting unit 138. Upon opening of the introduction valve 90, the spool 28 is displaced to the other end side while the spool 28 compresses the spring 30. At this time, since the first pressure reaches the pressure P2a (which is one half of the pressure P1a), the spool 28 becomes placed at a position between the first position and the second position. When this is done, compared to the case of the first pressure being the pressure P1a, since the degree of opening of the communication passage between the inlet port 40 and the outlet port 42 is smaller (i.e., becomes one half of the case of the pressure P1a), the pressure (second pressure) of the pressure fluid in the pressure fluid lead out passage 52 reaches the pressure P2b (which is one half of the pressure P1b). In addition, when the introduction valve 90 is closed, the first pressure is maintained at the pressure P2a, together with the second pressure being maintained at the pressure P2b.

Next, the discharge valve control unit 136 maintains the closed state of the discharge valve 92 until elapse of the time t4 after closing of the introduction valve 90. Upon doing so, during such a closed state, the pressure fluid continues to be ejected from the nozzle 50. At this time, the second pressure is maintained at the pressure P2b.

Further, the discharge valve control unit 136 opens and closes the discharge valve 92 after the time t4 elapses from closing of the introduction valve 90. When the discharge valve 92 is opened, since the spool 28 is restored to the second position, ejection of the pressure fluid from the nozzle 50 is stopped.

As can be understood from the present modification, with the present embodiment, by controlling the opening time (times t1, t3) of the introduction valve 90, the pressure (flow rate) of the pressure fluid that is led out from the outlet port 42 can be controlled. Further, by controlling the waiting time (times t2, t4) from switching of the introduction valve 90 from the open state to the closed state until the discharge valve 92 is opened, the timing at which the pressure fluid is ejected from the outlet port 42 can also be controlled.

More specifically, according to the present embodiment, because the spool 28 can be displaced corresponding to the opening time of the introduction valve 90, which is set by the opening time setting unit 138, with a simple structure, the pressure (flow rate) of the pressure fluid that is led out from the outlet port 42 can freely be controlled.

Further, according to the present embodiment, since the waiting time period until opening of the discharge valve 92 after closing of the introduction valve 90 can be set in the waiting time setting unit 140, with a simple structure, the timing at which the pressure fluid is led out from the outlet port 42 can freely be controlled.

(Modification 2)

Next, a control method for a spool valve 10 according to a second modification of the present embodiment will be described with reference to FIG. 10.

Figure 10:
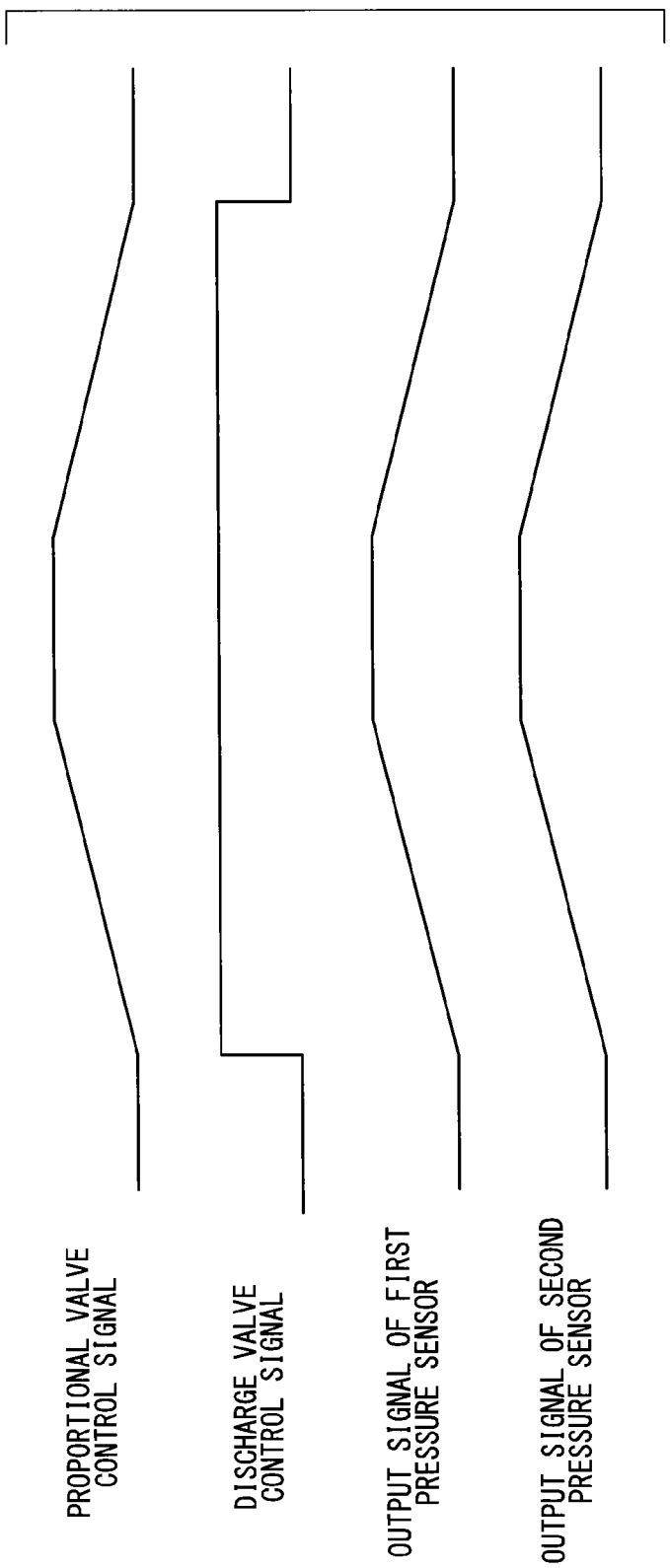
FIG. 10 is an explanatory diagram of a control method for a spool valve according to a second modification.

With the present modification, as shown in FIG. 10, the discharge valve control unit 136 opens the discharge valve 92, together with the proportional valve control unit 132 opening the proportional valve 88. When the proportional valve 88 is opened, the pilot fluid, which is led out from the second port 102 of the proportional valve 88, is guided to the one end surface of the spool 28 via the third introduction passage 120, the communication passage 78 of the retaining plate 36, and the hole 76 of the end plate 34. More specifically, the pressure of the pilot fluid acts on the one end surface of the spool 28. When acted on by the pilot fluid, the spool 28 is displaced to the other end side while compressing the spring 30. Upon displacement of the spool 28 to the other end side, since the inlet port 40 and the outlet port 42 are placed in communication, the pressure fluid that is led out from the outlet port 42 is ejected from the nozzle 50.

At this time, the discharge valve 92 is opened. Due to the fact that the inflow rate from the proportional valve 88 exceeds the discharge rate from the discharge valve 92, the pressure of the pilot fluid that acts on the one end surface of the spool 28 and the pressure of the pressure fluid that is led out from the outlet port 42 can be controlled. Further, the proportional valve control unit 132 controls the degree of opening of the proportional valve 88 based on the pressure acquired by the first pressure sensor 80 and the pressure acquired by the second pressure sensor 84. With the present modification, the proportional valve control unit 132 gradually increases the degree of opening of the proportional valve 88. Upon doing so, the first pressure and the second pressure gradually rise. Furthermore, the proportional valve control unit 132 gradually decreases the degree of opening of the proportional valve 88. Upon doing so, the first pressure and the second pressure gradually are lowered. With the present modification, after elapse of a predetermined time, the proportional valve control unit 132 closes the proportional valve 88, and the discharge valve control unit 136 closes the discharge valve 92.

According to the present modification, since the spool 28 can be displaced responsive to the degree of opening of the proportional valve 88, with a simple structure, the pressure (flow rate) of the pressure fluid led out from the outlet port 42 can be subjected to a proportional control.

Further, since the proportional valve control unit 132 controls the degree of opening of the proportional valve 88 based on the pressure acquired by the first pressure sensor 80 and the pressure acquired by the second pressure sensor 84, the pressure (flow rate) of the pressure fluid led out from the outlet port 42 can be controlled to a desired pressure (flow rate).

The present modification is not limited to performing the control precisely as described above. For example, the proportional valve control unit 132 may increase the degree of opening of the proportional valve 88 in a stepwise manner. In this case, the first pressure and the second pressure can be raised in a stepwise manner. Further, the proportional valve control unit 132 may decrease the degree of opening of the proportional valve 88 gradually (continuously) or in a stepwise manner.

In the case of implementing the present modification, the introduction valve 90 and the introduction valve control unit 134 may be dispensed with. In this case, the structure of the spool valve 10 can be further reduced in size. Further, the discharge valve 92 and the discharge valve control unit 136 may be dispensed with. In this case, the pilot fluid is always discharged at a constant discharge rate from the pilot fluid discharge passage 96. In addition, by causing the pilot fluid to be led out from the second port 102 of the proportional valve 88 in an amount that is greater than the aforementioned discharge rate, the pressure of the pilot fluid can be made to act on the one end surface of the spool 28. Consequently, the structure of the spool valve 10 can be made even smaller in size.

(Modification 3)

Figure 11:
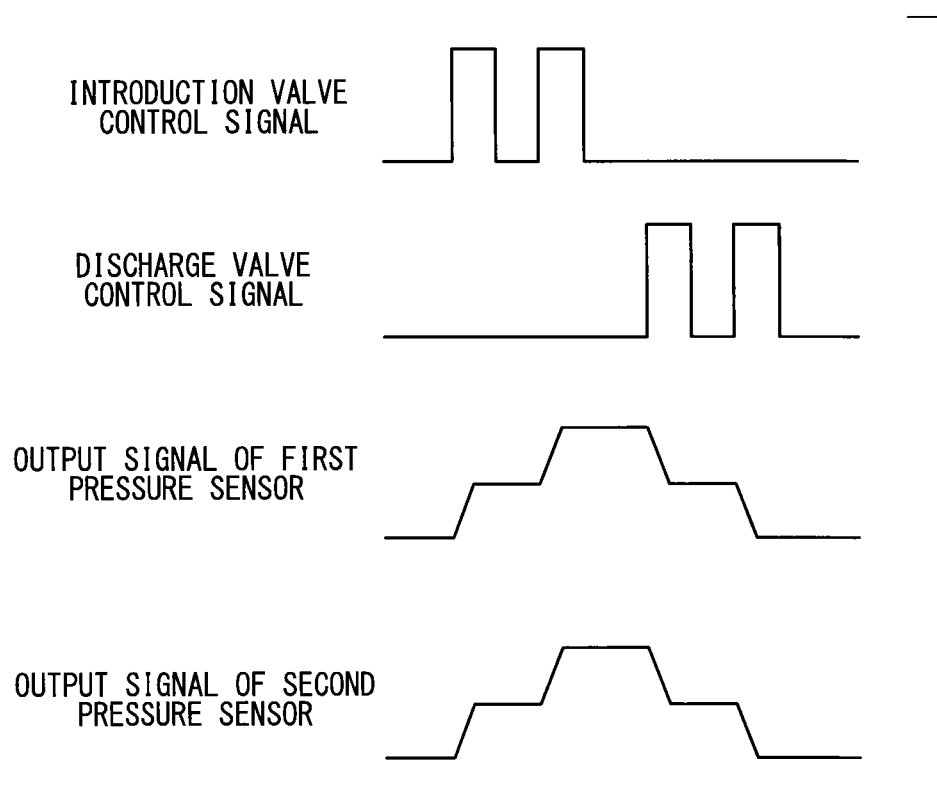
FIG. 11 is an explanatory diagram of a control method for a spool valve according to a third modification.

Next, a spool valve 10 according to a third modification of the present embodiment will be described with reference to FIG. 11. With the present modification, as shown in FIG. 11, after the introduction valve control unit 134 has opened and closed the introduction valve a plurality of times (two times in the illustrated example) in succession, the discharge valve control unit 136 then opens the discharge valve 92 a plurality of times (two times in the illustrated example) in succession. When this is done, the first pressure and the second pressure are raised stepwise, and thereafter, the first pressure and the second pressure are lowered stepwise. In this manner, according to the present modification, with a simple structure, the pressure (flow rate) of the pressure fluid that is led out from the outlet port 42 can be raised in a stepwise manner as well as lowered in a stepwise manner.

(Modification 4)

Figure 12:
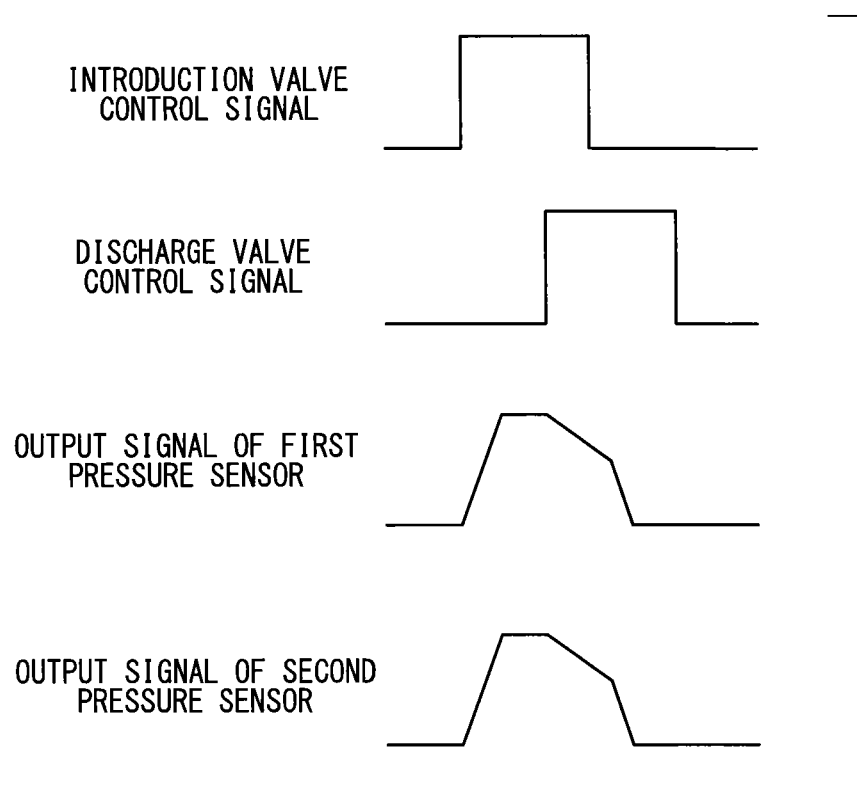
FIG. 12 is an explanatory diagram of a control method for a spool valve according to a fourth modification.

Next, a spool valve 10 according to a fourth modification of the present embodiment will be described with reference to FIG. 12. With the present modification, as shown in FIG. 12, in a condition in which the introduction valve control unit 134 maintains the introduction valve 90 in an open state, the discharge valve control unit 136 also opens the discharge valve 92. Upon doing so, after the first pressure and the second pressure are raised and have reached a constant pressure, the first pressure and the second pressure are decreased in a comparatively moderate fashion. In this manner, according to the present modification, compared to the case of opening the discharge valve 92 in a state in which the introduction valve 90 has been closed, the pressure (flow rate) of the pressure fluid that is led out from the outlet port 42 can be decreased more gradually.

(Modification 5)

Figure 13:
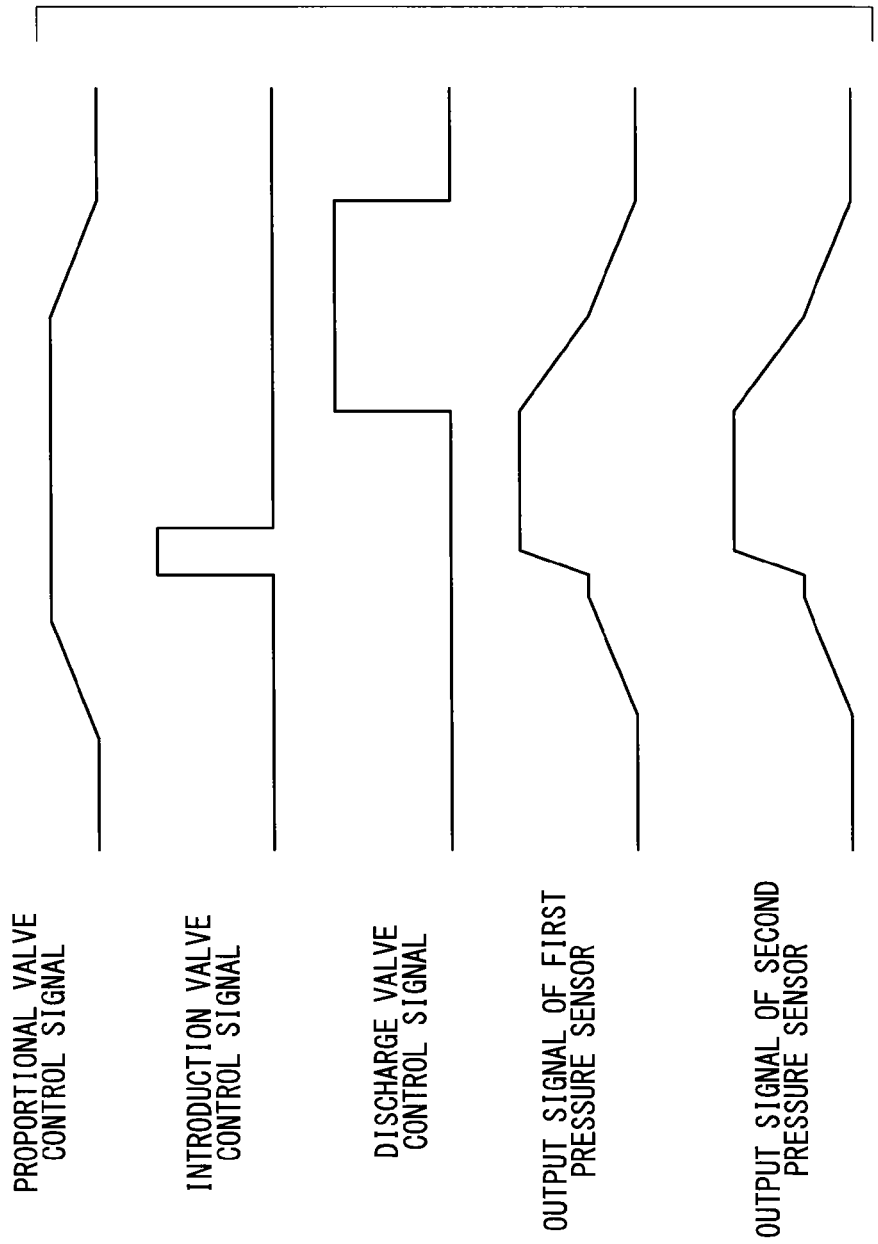
FIG. 13 is an explanatory diagram of a control method for a spool valve according to a fifth modification.

Next, a spool valve 10 according to a fifth modification of the present embodiment will be described with reference to FIG. 13. With the present modification, as shown in FIG. 13, in a condition in which the proportional valve control unit 132 maintains the proportional valve 88 in an open state, the introduction valve control unit 134 opens and closes the introduction valve 90, and the discharge valve control unit 136 opens and closes the discharge valve 92. When this is done, the first pressure and the second pressure are first raised gradually and thereafter raised at a greater rate. Further, after being decreased at a greater rate, the first pressure and the second pressure then are decreased more gradually.

According to the present modification, since the introduction valve 90 and the discharge valve 92 are opened and closed in a state in which the proportional valve is kept open, with a simple structure, the pressure (flow rate) of the pressure fluid that is led out from the outlet port 42 can be controlled efficiently to a desired pressure (flow rate).

The present modification is not limited to performing the control in the above-described manner. For example, while the proportional valve 88 is in an open condition, the introduction valve control unit 134 may open and close the introduction valve 90 a plurality of times, and the discharge valve control unit 136 may open and close the discharge valve 92 a plurality of times.

Although a preferred embodiment of the present invention has been presented above, the spool valve according to the present invention is not limited to this embodiment, and various changes and modifications may be made thereto without departing from the scope of the invention as set forth in the appended claims.

What is claimed is:

1. A spool valve comprising:
   a valve body formed with a valve chamber, and an inlet port and an outlet port that open on a wall surface of the valve chamber and through which a pressure fluid flows;
   a spool arranged in the valve chamber such that the spool is displaceable between a first position, which allows communication between the inlet port and the outlet port, and a second position, which blocks communication between the inlet port and the outlet port;
   a pilot valve mechanism disposed in the valve body and which causes displacement of the spool along an axial direction under a pressure of a pilot fluid that acts on only one end surface of the spool; and
   a spring that biases the spool toward one side in the axial direction.

2. The spool valve according to claim 1, wherein the pilot valve mechanism includes:
   a pilot fluid introduction passage that guides the pilot fluid to the one end surface of the spool;
   a pilot fluid discharge passage through which the pilot fluid is discharged; and
   a proportional valve disposed in the pilot fluid introduction passage, and
   the spool is displaced corresponding to a degree of opening of the proportional valve.

3. The spool valve according to claim 2, further comprising:
   first pressure acquiring means for acquiring a pressure of the pilot fluid that acts on the one end surface of the spool;
   second pressure acquiring means for acquiring a pressure of the pressure fluid led out from the outlet port; and
   a proportional valve control unit that controls the degree of opening of the proportional valve based on the pressure acquired by the first pressure acquiring means and the pressure acquired by the second pressure acquiring means.

4. The spool valve according to claim 1, wherein the pilot valve mechanism includes:
   a pilot fluid introduction passage that guides the pilot fluid to the one end surface of the spool;
   a pilot fluid discharge passage through which the pilot fluid is discharged;

an introduction valve that switches the pilot fluid introduction passage between an open condition and a closed condition;

a discharge valve that switches the pilot fluid discharge passage between an open condition and a closed condition;

an introduction valve control unit that controls the introduction valve; and a discharge valve control unit that controls the discharge valve.

5. The spool valve according to claim 4, further comprising:

an opening time setting unit that sets a time of opening of the introduction valve, wherein the introduction valve control unit opens and closes the introduction valve based on the time of opening set by the opening time setting unit.

6. The spool valve according to claim 4, further comprising:

a waiting time setting unit that sets a waiting time from switching of the introduction valve from the open condition to the closed condition until the discharge valve is opened, wherein the discharge valve control unit maintains the discharge valve in the closed condition until elapse of the waiting time set by the waiting time setting unit from switching of the introduction valve from the open condition to the closed condition.

7. The spool valve according to claim 4, wherein the introduction valve control unit opens and closes the introduction valve multiple times in succession.

8. The spool valve according to claim 4, wherein the discharge valve control unit opens and closes the discharge valve multiple times in succession.

9. The spool valve according to claim 4, wherein the discharge valve control unit opens the discharge valve with the introduction valve being in the open condition.

10. The spool valve according to claim 4, wherein:

the pilot valve mechanism further includes a proportional valve disposed in the pilot fluid introduction passage;

the introduction valve control unit opens and closes the introduction valve under a condition in which the proportional valve is open; and the discharge valve control unit opens and closes the discharge valve under a condition in which the proportional valve is open.

11. The spool valve according to claim 1, wherein:

a discharge port that opens on the wall surface of the valve chamber is formed in the valve body; and in a condition in which the spool is positioned at the second position, communication is established between the outlet port and the discharge port, and in a condition in which the spool is positioned at the first position, communication is blocked between the outlet port and the discharge port.

12. The spool valve according to claim 2, further comprising:

a first pressure sensor to acquire a pressure of the pilot fluid that acts on the one end surface of the spool;

a second pressure sensor to acquire a pressure of the pressure fluid led out from the outlet port; and a proportional valve control unit that controls the degree of opening of the proportional valve based on the pressure acquired by the first pressure sensor and the pressure acquired by the second pressure sensor.

13. A spool valve comprising:

a valve body formed with a valve chamber, and an inlet port and an outlet port that open on a wall surface of the valve chamber and through which a pressure fluid flows;

a spool arranged in the valve chamber such that the spool is displaceable between a first position, which allows communication between the inlet port and the outlet port, and a second position, which blocks communication between the inlet port and the outlet port;

a pilot valve mechanism disposed in the valve body and which causes displacement of the spool along an axial direction under a pressure of a pilot fluid that acts on one end surface of the spool; and a spring that biases the spool toward one side in the axial direction, wherein the pilot valve mechanism includes:

a pilot fluid introduction passage that guides the pilot fluid to the one end surface of the spool, a pilot fluid discharge passage through which the pilot fluid is discharged, and a proportional valve disposed in the pilot fluid introduction passage, and the spool is displaced corresponding to a degree of opening of the proportional valve.

14. A spool valve comprising:

a valve body formed with a valve chamber, and an inlet port and an outlet port that open on a wall surface of the valve chamber and through which a pressure fluid flows;

a spool arranged in the valve chamber such that the spool is displaceable between a first position, which allows communication between the inlet port and the outlet port, and a second position, which blocks communication between the inlet port and the outlet port;

a pilot valve mechanism disposed in the valve body and which causes displacement of the spool along an axial direction under a pressure of a pilot fluid that acts on one end surface of the spool; and a spring that biases the spool toward one side in the axial direction, wherein the pilot valve mechanism includes:

a pilot fluid introduction passage that guides the pilot fluid to the one end surface of the spool, a pilot fluid discharge passage through which the pilot fluid is discharged, an introduction valve that switches the pilot fluid introduction passage between an open condition and a closed condition, a discharge valve that switches the pilot fluid discharge passage between an open condition and a closed condition, an introduction valve control unit that controls the introduction valve, and a discharge valve control unit that controls the discharge valve.

* * * * *